United States Patent
Urban et al.

(10) Patent No.: US 7,892,373 B2
(45) Date of Patent: Feb. 22, 2011

(54) ADHESIVE FOR NONCERAMIC FLOOR COVERINGS

(75) Inventors: Dieter Urban, Speyer (DE); Alexander Centner, Rödersheim-Gronau (DE); Armin Burghart, Charlotte, NC (US)

(73) Assignee: BASF Aktiengesellschaft, Ludwigshafen (DE)

( * ) Notice: Subject to any disclaimer, the term of this patent is extended or adjusted under 35 U.S.C. 154(b) by 630 days.

(21) Appl. No.: 11/206,912

(22) Filed: Aug. 19, 2005

(65) Prior Publication Data

US 2007/0039679 A1    Feb. 22, 2007

(51) Int. Cl.
*E04F 15/00* (2006.01)
*C08K 5/01* (2006.01)
*H01B 3/46* (2006.01)

(52) U.S. Cl. .......... 156/71; 156/326; 524/476; 524/528; 524/837

(58) Field of Classification Search .......... 156/71, 156/326, 329, 325; 524/101, 188, 262, 274, 524/425, 476, 487, 489, 528, 547, 837, 839
See application file for complete search history.

(56) References Cited

U.S. PATENT DOCUMENTS

| 5,100,948 | A | | 3/1992 | Aydin et al. | |
|---|---|---|---|---|---|
| 5,137,764 | A | * | 8/1992 | Doyle et al. | 428/44 |
| 5,240,992 | A | | 8/1993 | Yamaya | |
| 5,994,428 | A | | 11/1999 | Lutz et al. | |
| 6,114,423 | A | | 9/2000 | Eck et al. | |
| 6,119,423 | A | * | 9/2000 | Costantino | 52/390 |
| 6,169,132 | B1 | * | 1/2001 | Fickeisen et al. | 524/271 |
| 6,258,460 | B1 | | 7/2001 | Phan et al. | |
| 6,528,590 | B1 | | 3/2003 | Beyer et al. | |
| 6,541,566 | B1 | | 4/2003 | Farwaha et al. | |
| 6,620,881 | B1 | | 9/2003 | Saija et al. | |
| 6,624,243 | B2 | | 9/2003 | Stark et al. | |
| 2002/0007009 | A1 | | 1/2002 | Stark et al. | |

FOREIGN PATENT DOCUMENTS

| DE | 195 26 759 A1 | 1/1997 |
|---|---|---|
| DE | 197 36 409 A1 | 2/1999 |
| EP | 0 035 332 A2 | 9/1981 |
| EP | 0 366 969 B1 | 5/1990 |
| EP | 0 419 242 | 3/1991 |
| EP | 1 153 979 A2 | 11/2001 |
| WO | WO 99/37716 | 7/1999 |

* cited by examiner

*Primary Examiner*—Philip C Tucker
*Assistant Examiner*—Sing P Chan
(74) *Attorney, Agent, or Firm*—Oblon, Spivak, McClelland, Maier & Neustadt, L.L.P.

(57) ABSTRACT

Non-ceramic floor coverings are bonded to a substrate by an aqueous adhesive that comprises a synthetic polymer as a binder and hydrolyzable silane groups.

20 Claims, No Drawings

ADHESIVE FOR NONCERAMIC FLOOR COVERINGS

BACKGROUND OF THE INVENTION

1. Field of the Invention

The invention relates to a process for bonding nonceramic floor coverings to a substrate, wherein an aqueous adhesive is used, which comprises a synthetic polymer as a binder and wherein the adhesive comprises hydrolyzable silane groups. In particular the invention relates to a process for bonding flexible floor coverings, such as carpets, or for bonding wood floors to the floor (substrate).

2. Description of the Background

The use of polymers comprising silane groups as adhesives for ceramic substrates, i.e., in particular for tiles, is described in EP-A-35332, EP-A-366969 and DE-A-197 36 409.

SUMMARY OF THE INVENTION

Polymers comprising silane groups and intended for other uses are known, furthermore, from U.S. Pat. No. 6,541,566, U.S. Pat. No. 6,620,881, U.S. Pat. No. 6,258,460, U.S. Pat. No. 6,528,590 and U.S. Pat. No. 5,240,992, and also from EP-A-1,153,979, DE-A-195 26 759 and WO 99/37716, for example.

In the case of the ceramic floor coverings the interaction of the silane groups in the polymer with the silicates of the ceramic substrates, especially tiles, in particular, leads to advantageous properties. In the case of nonceramic substrates such as carpets and wood floors there is no such interaction.

In connection with the bonding of wood floors or carpets to the substrate, high strengths are desired. Another factor of importance is a high heat stability: even at relatively high temperatures, caused for example by intensive sun exposure, the bond is to retain its strength.

In the case of flexible floor coverings a further desire is for good so called green strength development and open time. Good green strength development means that after the carpet has been laid on the substrate, which has been coated with the adhesive, an early firm bond develops.

Good open time means that a firm bond between floor and carpet can be obtained even after a long period of ventilation before the carpet is laid on the floor.

The desire is therefore for adhesives for nonceramic floor coverings that meet the above requirements to maximum effect.

In accordance with this desire the process defined above is found.

The process involves the use of an aqueous adhesive which comprises a synthetic polymer as a binder and hydrolyzable silane groups.

DETAILED DESCRIPTION OF THE PREFERRED EMBODIMENTS

To the Synthetic Polymer

The polymer in particular is in the form of an aqueous dispersion. The polymer, or the aqueous dispersion of the polymer, is preferably obtainable by free-radical addition polymerization of ethylenically unsaturated compounds (monomers).

The polymer is composed preferably of at least 40%, more preferably of at least 60% and very preferably of at least 80% by weight of what are known as principal monomers.

The principal monomers are selected from C1 to C20 alkyl (meth)acrylates, vinyl esters of carboxylic acids comprising up to 20 carbon atoms, vinylaromatics having up to 20 carbon atoms, ethylenically unsaturated nitriles, vinyl halides, vinyl ethers of alcohols comprising 1 to 10 carbon atoms, aliphatic hydrocarbons having 2 to 8 carbon atoms and one or two double bonds, or mixtures of these monomers.

Examples of alkyl (meth)acrylates include (meth)acrylic acid alkyl esters having a C1-C10 alkyl radical, such as methyl methacrylate, methyl acrylate, n-butyl acrylate, ethyl acrylate and 2-ethylhexyl acrylate.

In particular, mixtures of the (meth)acrylic acid alkyl esters are also suitable.

Vinyl esters of carboxylic acids having 1 to 20 carbon atoms are, for example, vinyl laurate, vinyl stearate, vinyl propionate, Versatic acid vinyl esters and vinyl acetate. Suitable vinylaromatic compounds include vinyltoluene, α- and p-methylstyrene, α-butylstyrene, 4-n-butylstyrene, 4-n-decylstyrene and, preferably, styrene. Examples of nitriles are acrylonitrile and methacrylonitrile.

The vinyl halides are ethylenically unsaturated compounds substituted by chlorine, fluorine or bromine, preferably vinyl chloride and vinylidene chloride.

Examples of vinyl ethers include vinyl methyl ether or vinyl isobutyl ether. Preferred vinyl ethers are those of alcohols comprising 1 to 4 carbon atoms.

As hydrocarbons having 2 to 8 carbon atoms and one or two olefinic double bonds mention may be made of ethylene, propylene, butadiene, isoprene and chloroprene.

Preferred principal monomers are the C1 to C20 alkyl acrylates and methacrylates, especially C1 to C10 alkyl acrylates and methacrylates, and vinylaromatics, especially styrene, and mixtures of the alkyl (meth)acrylates with styrene.

Very particular preference is given to methyl acrylate, methyl methacrylate, ethyl acrylate, n-butyl acrylate, n-hexyl acrylate, octyl acrylate and 2-ethylhexyl acrylate, styrene, and mixtures of these monomers.

With particular preference the polymer is composed of at least 40%, in particular at least 60% and very preferably at least 80% by weight of C1-C20, especially C1-C10 alkyl (meth)acrylates.

Besides the principal monomers the polymer may comprise further monomers, examples being monomers containing carboxylic acid, sulfonic acid or phosphonic acid groups. Carboxylic acid groups are preferred. Examples that may be mentioned include acrylic acid, methacrylic acid, itaconic acid, maleic acid or fumaric acid.

Further monomers are, for example, also hydroxyl-comprising monomers, especially C1-C10 hydroxyalkyl(meth) acrylates and also (meth)acrylamide.

Further monomers that may be mentioned include, moreover, phenyloxyethyl glycol mono(meth)acrylate, glycidyl acrylate, glycidyl methacrylate, and amino(meth)acrylates such as 2-aminoethyl(meth)acrylate.

As further monomers mention may also be made of crosslinking monomers.

The polymers are prepared in a preferred embodiment by emulsion polymerization, and the product is therefore an emulsion polymer.

Alternatively the preparation may take place by means of solution polymerization followed by dispersion in water.

In the case of emulsion polymerization, ionic and/or nonionic emulsifiers and/or protective colloids, and/or stabilizers, are used as surface-active compounds.

A detailed description of suitable protective colloids is found in Houben-Weyl, Methoden der organischen Chemie, Volume XIV/1, Makromolekulare Stoffe [macromolecular compounds], Georg-Thieme-Verlag, Stuttgart, 1961, pp. 411 to 420. Suitable emulsifiers include anionic, cationic and nonionic emulsifiers. As accompanying surface-active substances it is preferred to use exclusively emulsifiers, whose molecular weights, unlike those of the protective colloids, are usually below 2000 g/mol. When mixtures of surface-active substances are used it is of course necessary for the individual components to be compatible with one another, something which in case of doubt can be ascertained by means of a few preliminary tests. It is preferred to use anionic and nonionic emulsifiers as surface-active substances. Customary accompanying emulsifiers are, for example, ethoxylated fatty alcohols (EO units: 3 to 50, alkyl radical: C8- to C36), ethoxylated mono-, di- and tri-alkylphenols (EO units: 3 to 50, alkyl radical: C4- to C9), alkali metal salts of dialkyl esters of sulfosuccinic acid and also alkali metal and ammonium salts of alkyl sulfates (alkyl radical: C8- to C12), of ethoxylated alkanols (EO units: 4 to 30, alkyl radical: C12- to C18), of ethoxylated alkylphenols (EO units: 3 to 50, alkyl radical: C4- to C9), of alkylsulfonic acids (alkyl radical: C12- to C18) and of alkylarylsulfonic acids (alkyl radical: C9- to C18).

Further suitable emulsifiers are compounds of the general formula

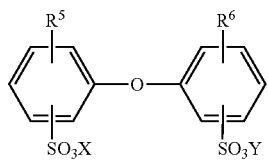

in which $R^5$ and $R^6$ are hydrogen or C4 to C14 alkyl and are not simultaneously hydrogen, and X and Y can be alkali metal ions and/or ammonium ions. $R^5$ and $R^6$ are preferably linear or branched alkyl radicals having 6 to 18 carbon atoms or hydrogen, and in particular having 6, 12 and 16 carbon atoms, but $R^5$ and $R^6$ are not both simultaneously hydrogen. X and Y are preferably sodium, potassium or ammonium ions, with sodium being particularly preferred. Particularly advantageous compounds II are those in which X and Y are sodium, $R^5$ is a branched alkyl radical having 12 carbon atoms and $R^6$ is hydrogen or $R^5$. Frequently use is made of technical mixtures which contain a fraction of 50% to 90% by weight of the monoalkylated product, an example being Dowfax® 2A1 (trademark of the Dow Chemical Company).

Suitable emulsifiers are also found in Houben-Weyl, Methoden der organischen Chemie, Volume 14/1, Makromolekulare Stoffe, Georg Thieme Verlag, Stuttgart, 1961, pages 192 to 208.

Trade names of emulsifiers are, for example, Dowfax® 2A1, Emulan® NP 50, Dextrol® OC 50, Emulgator 825, Emulgator 825 S, Emulan® OG, Texapon® NSO, Nekanil® 904 S, Lumiten® I-RA, Lumiten E 3065, Disponil FES 77, Lutensol AT 18, Steinapol VSL and Emulphor NPS 25.

The surface-active substance is used usually in amounts of 0.1% to 10% by weight, based on the monomers to be polymerized.

Water-soluble initiators for the emulsion polymerization are, for example, ammonium salts and alkali metal salts of peroxodisulfuric acid, e.g., sodium peroxodisulfate, hydrogen peroxide or organic peroxides, e.g., tert-butyl hydroperoxide.

Also suitable are what are known as reduction-oxidation (redox) initiator systems.

The redox initiator systems are composed of at least one reducing agent, usually an inorganic reducing agent, and one organic or inorganic oxidizing agent.

The oxidizing component comprises, for example, the emulsion polymerization initiators already mentioned above.

The reducing components comprise, for example, alkali metal salts of sulfurous acid, such as sodium sulfite, sodium hydrogen sulfite, alkali metal salts of disulfurous acid such as sodium disulfite, bisulfite addition compounds with aliphatic aldehydes and ketones, such as acetone bisulfite, or reducing agents such as hydroxymethanesulfinic acid and its salts, or ascorbic acid. The redox initiator systems can be used along with soluble metal compounds whose metallic component is able to exist in a plurality of valence states.

Customary redox initiator systems are, for example, ascorbic acid/iron(II) sulfate/sodium peroxodisulfate, tert-butyl hydroperoxide/sodium disulfite, tert-butyl hydroperoxide/Na hydroxymethanesulfinate. The individual components, e.g., the reducing component, may also be mixtures: for example, a mixture of the sodium salt of hydroxymethanesulfinic acid and sodium disulfite.

The compounds stated are used mostly in the form of aqueous solutions, the lower concentration being determined by the amount of water that is acceptable in the dispersion and the upper concentration being determined by the solubility of the respective compound in water. In general the concentration is 0.1% to 30%, preferably 0.5% to 20%, more preferably 1.0% to 10% by weight, based on the solution.

The amount of the initiators is generally 0.1% to 10%, preferably 0.5% to 5%, by weight based on the monomers to be polymerized. It is also possible for two or more different initiators to be used in the emulsion polymerization.

In the course of the polymerization it is possible to use regulators, in amounts for example of 0 to 0.8 part by weight per 100 parts by weight of the monomers to be polymerized, and these regulators reduce the molar mass. Suitable examples include compounds having a thiol group, such as tert-butyl mercaptan, thioglycolic acid ethyl acrylic esters, mercaptoethynol, mercaptopropyltrimethoxysilane or tert-dodecyl mercaptan.

The emulsion polymerization takes place in general at 30 to 130° C., preferably 50 to 90° C. The polymerization medium may be composed either of water alone or else of mixtures of water with water-miscible liquids such as methanol. It is preferred to use just water. The emulsion polymerization can be carried out either as a batch operation or in the form of a feed process, including stage or gradient procedures. Preference is given to the feed process, where a portion of the polymerization batch is introduced as an initial charge, heated to the polymerization temperature and partially polymerized, and then the remainder of the polymerization batch, usually by way of two or more spatially separate feeds, of which one or more comprise the monomers in pure or in emulsified form, is supplied to the polymerization zone continuously, in stages or subject to a concentration gradient, and during this addition the polymerization is maintained. In connection with the polymerization it is also possible, with the aim, for example, of improved setting of particle size, to include a polymer seed in the initial charge.

The manner in which the initiator is added to the polymerization vessel in the course of the free-radical aqueous emulsion polymerization is known to the skilled worker. It may either be included in its entirety in the initial charge to the polymerization vessel or else may be inserted continuously or in stages at the rate at which it is consumed in the course of the free-radical aqueous emulsion polymerization. Specifically this will depend on the chemical nature of the initiator system and on the polymerization temperature. Preferably, one portion is included in the initial charge and the remainder is supplied to the polymerization zone at the rate at which it is consumed.

For the purpose of removing residual monomers it is usual to add initiator even after the end of the actual emulsion polymerization, i.e., after monomer conversion of at least 95%.

The individual components can be added to the reactor, in the case of the feed process, from above, through the side or from below, through the reactor floor.

In the case of emulsion polymerization, aqueous dispersions of the polymer are obtained which generally have solids contents of 15% to 75%, preferably of 40% to 75%, by weight.

For the purposes of the present invention a preferred solids content is from 50% to 75%, in particular from 55% to 75%, by weight.

For a high reactor space/time yield, preference is given to dispersions having a solids content which is very high. In order to be able to achieve solids contents >60% by weight, a bimodal or polymodal particle size ought to be set, since otherwise the viscosity becomes too high and the dispersion can no longer be handled. Producing a new generation of particles can be accomplished, for example, by adding seed (EP 81083), by adding excess quantities of emulsifier, or by adding miniemulsions. A further advantage associated with the combination of low viscosity and high solids content is the improved coating behavior at high solids contents. One or more new generations of particles can be produced at any point in time. Their production is governed by the particle size distribution that is aimed at for a low viscosity.

The polymer thus prepared is used preferably in the form of its aqueous dispersion. The viscosity of the polymer dispersion is preferably 50 to 1000, in particular 50 to 500 mPas.

The glass transition temperature of the polymer, or of the emulsion polymer, is preferably −60 to 0° C., more preferably −60 to −10° C. and very preferably −60 to −20° C.

The glass transition temperature can be determined by customary methods such as differential thermoanalysis or differential scanning calorimetry (see, e.g., ASTM 3418/82, midpoint temperature).

The pH value of the polymer dispersion is preferably from 5 to 8, most preferably from 5 to 7. In this range of pH the hydrolyzation reaction is retarded, retardation is especially observed with alkoxy groups with more than 2 C atoms, specifically with isopropoxy groups. Hydrolyzation occurs or can be accelerated with a pH value below or above this range or by increasing the temperature.

To the Hydrolysable Silane

A hydrolyzable silane group is a molecular group which reacts with water (hydrolysis) to form an OH group attached directly to the silicon atom.

In particular the hydrolyzable silane group has at least one alkoxy group attached to a silicon atom.

The hydrolyzable silane group may be bonded to the above synthetic polymer itself; alternatively the adhesive may comprise a further additive with hydrolyzable silane groups.

The silane groups bonded to the polymer are in particular of the formula I

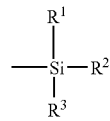

in which $R^1$ to $R^3$ independently of one another are each an organic radical, with the proviso that at least one of the groups $R^1$-$R^3$ is an alkoxy group, in particular a $C_1$-$C_8$ alkoxy group, preferably a $C_1$-$C_4$ alkoxy group. With particular preference two, three or all of the groups $R^1$ to $R^3$ are an alkoxy group.

A suitable alkoxy group with very particular preference is the methoxy group, the ethoxy group or else, in particular, the isopropoxy group.

The remaining groups are each another organic radical, in particular an organic radical which can comprise up to 20 carbon atoms and, if appropriate, heteroatom, such as O, N, S. Particularly suitable are alkyl groups, especially $C_1$-$C_{20}$, $C_1$-$C_{10}$ alkyl groups.

This silane group is attached to the polymer via the 4th free valence.

Examples of suitable silane groups are mono-, di- or tri-alkoxysilane groups, with the remaining radicals being organic groups, especially alkyl groups.

The polymer comprises preferably 0.001 to 0.1 mol, more preferably 0.001 to 0.01 mol and very preferably 0.001 to 0.005 mol of the silane groups per 100 g of polymer.

The silane groups may be attached to the polymer as a result of copolymerization with monomers comprising silane groups, use of regulators comprising silane groups, or reaction of the polymer with reactive compounds comprising silane groups.

Suitable monomers or regulators comprising silane groups include those of the formula II

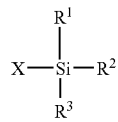

where $R^1$ to $R^3$ are as defined above and X is an organic group having at least one, preferably one, copolymerizable, ethylenically unsaturated group, in particular a vinyl, especially an acrylic or methacrylic group, or an allyl group, or a regulating group (i.e., a chain-terminating group), in particular a mercapto group. Besides the copolymerizable group or regulating group it is also possible in particular for X to comprise a spacer group, such as an alkylene group, for example, which joins the copolymerizable or regulating group to the silicon atom. The copolymerizable or regulating group may also, however, be directly attached to the silicon atom. Preferably X has a molar weight of less than 200, in particular less than 100 g/mol.

Examples of monomers include vinyltriethoxysilane, vinyltriisopropoxysilane, wherein the vinyl group is directly bound to the silicon atom, methacryloxy propyl trimethoxysilane, wherein the methacrylic group is bound to the silicon atom via a propyl group as spacer. As regulator mercaptopropyltrimethoxysilane may be mentioned.

The amount of above monomers or regulators in the polymer is chosen such that the above silane group content is achieved; generally for this purpose 0.005 to 5 parts by weight, more preferably 0.01 to 2.0 most preferably 0.1 to 1.0 parts by weight per 100 parts by weight of polymer are sufficient.

Alternatively the adhesive may comprise an additive with hydrolyzable silane groups.

Such additives may preferably be chemical compounds which comprise a group of above formula I. Preferred additives have a low molecular weight of 100 to 2000 g/mol, most preferably 100 to 1000 g/mol, especially of 100 to 250 g/mol. Most preferably such additives have above formula I, wherein the free valance to the polymer is replaced by a further substituent R4.

R4 may be an hydrogen atom or an organic radical, in particular an organic radical which can comprise up to 20 carbon atoms and, if appropriate, heteroatom, such as O, N, S. Particularly suitable are alkyl groups, especially $C1$-$C_{20}$, $C_1$-$C_{10}$ alkyl groups or above defined alkoxy groups. Most preferred R4 comprises a functional group like an hydroxy group, a primary, secondary or tertiary amino group, an isocyanate group, an ureido group, a carbamate group, an anhydride group, carboxylic or an epoxy group, for example a glycidyl group. With particular preference one, two or three of the groups $R^1$ to R4 are an alkoxy group.

Examples for such additives are 3-aminopropyltrimethoxysilane, 3-ureidopropyltrimethoxysilane, 3-isocyanatopropyltrimethoxysilane. Suitable silanes are offered by Wacker under the trade name Geniosil®.

The adhesive may comprise a synthetic polymer with silane groups or an additive with silane groups or both, a synthetic polymer with silane groups and an additive with silane groups.

The total amount of the silane group (corresponding to formula I) is preferably 0.001 to 0.1 mol, more preferably 0.001 to 0.01 mol and very preferably 0.001 to 0.005 mol per 100 g of the synthetic polymer, whereby the silane group may be bonded to the polymer or may be part of an additive or both.

To the Use of the Aqueous Adhesive

The aqueous adhesive comprises the above polymer as binder. The aqueous adhesive may be composed solely of the binder or of the aqueous dispersion of the binder; alternatively it may comprise further constituents.

The aqueous adhesive is used in accordance with the invention for bonding non-ceramic floor coverings. Ceramic floor coverings are, in particular, tiles.

In the case of the nonceramic floor coverings a distinction is to be made between flexible and nonflexible floor coverings.

To the Use For Flexible Floor Coverings

For this application the aqueous adhesive may comprise, in particular, fillers, tackifying resins (tackifiers), thickeners, defoamers or wetting agents and/or dispersing assistants as further additives.

For this application the adhesive preferably comprises fillers.

Suitable fillers include, in particular, inorganic fillers. Examples that may be mentioned include fine-ground or precipitated chalks especially those having an average particle diameter of generally between 2 and 50 mm and/or quartz flour having a usual average particle diameter of 3 to 50 mm.

The amount of the fillers is in particular 10 to 1000 parts by weight, more preferably at least 30, most preferably at least 60 parts by weight per 100 parts by weight of polymer (solids, without solvent).

Preferred tackifying resins (tackifiers) are resins based on abietic or modified abietic acid, e.g., hydrogenated or disproportionated abietic acid or esters of these compounds, having a glass transition temperature of 0 to 90° C., preferably 40 to 85° C.

Resins of this kind are known in particular as rosins.

For improved surface wetting it is possible for the adhesives to comprise, in particular, wetting assistants, examples being fatty alcohol ethoxylates, alkylphenol ethoxylates, sulfosuccinic esters, nonylphenol ethoxylates, polyoxyethylenes/propylenes or sodium dodecylsulfonates.

Wetting agents may be comprised, for example, in amounts of 0 to 5 parts by weight, thickeners in amounts of 0 to 10 parts by weight, preservatives in amounts of 0 to 3 parts by weight and defoamers in amounts of 0 to 10 parts by weight per 100 parts by weight of polymer (solids, without solvent) in the aqueous adhesive.

The adhesive is preferably essentially free and more preferably totally free from organic solvents and plasticizers such as butyl acetate, toluene or phthalates, for example. It therefore comprises organic compounds having a boiling point below 300° C. under atmospheric pressure (1 bar) in amounts below, preferably, 0.5 part by weight, more preferably below 0.1 part by weight, very preferably below 0.05 part by weight and in particular below 0.01 part by weight per 100 parts by weight of polymer (solids, without solvent). With particular preference the adhesive meets the requirements of freedom from emissions as defined by the German Association for Emissions-Controlled Installation Materials (Gemeinschaft Emissionskontrollierter Verlegewerkstoffe).

The emissions are determined by a chamber test method. The flooring adhesive or the composition of the invention is applied at 300 g/m$^2$ to a glass plate whose size is governed by the volume of the chamber. The chamber is loaded with 0.4 m$^2$ of the coated glass plate per m$^3$ of chamber volume. The emission conditions in the stainless steel testing chamber (whose volume is at least 125 liters) are 23° C., 50% relative humidity and an hourly air-change regime which results in complete air exchange every 2 hours. After 10 days the long-term emissions are determined. For this purpose a defined volume of the airstream is passed over adsorbents. Following desorption, the substances emitted are determined by gas (GC-MS coupling) or liquid chromatography. The long-term emissions are determined in mg/m$^3$, using toluene as a standard substance. Emitted substances, whose chamber concentration is greater than 20 mg/m$^3$ are identified and calibrated with the identified pure substance. Emitted substances whose chamber concentration is less than 20 mg/m$^3$ are not identified individually. In these cases the calibration is with toluene.

The values for all substances are added up.

In the case of the composition of the invention, the emission value for the sum of all organic compounds is not more than preferably 1500 mg/m$^3$ and in particular not more than 500 mg/m$^3$.

The aqueous adhesive can be prepared in a simple way, for example, by adding the fillers and if appropriate further additives, with stirring, to the aqueous polymer dispersion obtained from the emulsion polymerization.

The water content of the aqueous adhesive may be for example 5% to 50%, in particular 10% to 40%, by weight based on the aqueous composition as a whole.

Flexible floor coverings are, in particular, carpets or other floor coverings, made, for example, from PVC (in configurations as multilayer coverings or homogeneous coverings), foam coverings with a textile backing (e.g., jute), polyester nonwoven, rubber coverings, textile coverings, including those, for example, with various backings (such as polyurethane foam, styrene-butadiene foam, a textile secondary backing), needlefelt floor coverings, polyolefin coverings or linoleum coverings.

These flexible floor coverings may be glued to substrates such as wood, plastic, mineral substrates such as screeding, concrete, ceramic tiles, metal substrates or the like.

The adhesive can be applied to the substrate using, for example, a toothed applicator. After customary venting, the floor covering is laid on.

To the Use For Nonflexible Floor Coverings

Nonflexible floor coverings for the purposes of the present invention are, in particular, wood floors, preferably wood block floors or laminate floors. In this case, in accordance with the invention, the adhesive is used not for bonding the individual boards to one another but rather for bonding the boards to the substrate (non-floating installation).

The aqueous adhesive comprises the above polymer as binder. For this application the aqueous adhesive may be composed solely of the binder or of the aqueous dispersion of the binder; alternatively it may comprise further constituents, in particular, for example fillers, tackifying resins (tackifiers), thickeners, defoamers or wetting agents and/or dispersing assistants.

The adhesive composition of the invention exhibits a good level of performance properties such as peel strength (adhesion), very good shear strength (cohesion in the adhesive layer), green strength development (development of early shear strength), open time (still good adhesion after long ventilation) and heat resistance.

A) Examples for Nonflexible Floor Coverings

Wood Floors

Polymer Synthesis

General information: The reactions were run as semi-batch emulsion polymerizations on reactors equipped with a mechanical stirrer. The following materials were used in the polymerizations: SULFOLE™ 120 t-dodecyl mercaptan (from Phillips Petroleum of Bartlesville, Okla.) was used as a chain transfer agent, Trilon BX, TEXAPON™ K 12 PA 15 sodium lauryl sulfate (Cognis Corp., Cincinnati, Ohio) as a 15% aqueous solution and Iconol™ TDA-8 ethoxylated nonionic surfactant (BASF Corp.) as a 90% solution were used as surface-active agents; as silanes DYNASYLAN VTEO (=vinyltriethoxysilane) from Degussa and COATOSIL 1706 (=vinyltris(isopropoxy)silane) from GE Silicones were used.

Procedure, here outlined for Latex 1: A mixture of 199.6 g water, 0.06 g 40% aqueous solution of g Trilon BX and 0.6 g ascorbic acid were charged to a reaction vessel, and the mixture was heated to 90° C. From an initiator feed of 116.2 g water and 8.7 g sodium persulfate, 10% was removed and added to the reaction mixture. Subsequently, the following three separate feeds were added with constant feed rate in this manner: (a) the remainder of the initiator feed was added within 3.75 hours; (b) from a monomer emulsion mixture feed (consisting of 165.0 g water, 45.2 g 15% aqueous sodium lauryl sulfate, 5.0 g 90% aqueous Iconol TDA-8, 45.2 g 10% aqueous sodium hydroxide, 1.1 g t-dodecylmercaptan, 33.9 g methacrylic acid, and 1039.6 g n-butyl acrylate) 20 g were added within 15 min, subsequently another 60 g within 15 min, and the remainder within 3.0 hours; (c) after a time delay of 30 min 56.5 g acrylonitrile were added within 2.5 h. During the entire duration of the feeds the temperature was held at 90° C. After the feed stage the monomer emulsion tank was flushed with 16.3 g water, and the temperature was changed to 85° C. The dispersion was post-stripped by adding the following two mixtures as two separate feeds over the course of 2 hours: (a) 6.5 g 70% tert-butyl hydroperoxide solution and 33.5 g water and (b) 4.5 g sodium metabisulfite, 2.6 g acetone and 32.9 g water. Next, a solution of 22.6 g 10% NaOH and 19.2 g water was added, and 1.5 g 12.5% hydrogen peroxide. The latex was then cooled, and optional post-additions were added (biocide).

Latex 2: Preparation of Latex 1, with these changes: 11.3 g AAEM and 1028.3 g n-butyl acrylate were used.

Latex 3: Preparation of Latex 1, with these changes: 6.8 g vinyltriethoxysilane, 1028.3 g n-butyl acrylate and 61.0 g acrylonitrile were used.

Latex 4: Preparation of Latex 1, with these changes: 8.5 g vinyltris(isopropoxy)silane, 1028.3 g n-butyl acrylate and 59.3 g acrylonitrile were used.

Latex 5: 156.0 g water in the initial charge and 94.8 g water in the monomer emulsion were used.

Latex 6: Preparation of Latex 1, with these changes: 4.2 g vinyltriethoxysilane, 1100.0 g n-butyl acrylate, 156.0 g water in the initial charge and 94.8 g water in the monomer emulsion were used.

Latex 7: Preparation of Latex 1, with these changes: 22.6 g diacetoneacrylamide and 1017.0 g n-butyl acrylate were used.

Latex 8: Preparation of Latex 1, with these changes: 4.5 g vinyltris(isopropoxy)silane, 1032.3 g n-butyl acrylate and 59.3 g acrylonitrile were used.

Latex 9: Preparation of Latex 1, with these changes: initial charge was 195.0 g water, 0.07 g Trilon BX and 0.65 g ascorbic acid; monomer emulsion mixture was 144.3 g water, 52.0 g 15% aqueous sodium lauryl sulfate, 5.8 g 90% aqueous Iconol TDA-8, 52.0 g 10% aqueous sodium hydroxide, 9.8 g 53% aqueous acrylamide, 19.5 g methacrylic acid, and 1171.3 g n-butyl acrylate; other ingredients were the same as in Latex 1, multiplied by a factor of 1.08.

Latex 10: Preparation of Latex 9, with these changes: 9.8 g vinyltris(isopropoxy)silane and 1161.6 g n-butyl acrylate were used.

Latex 11: Preparation of Latex 9, with these changes: 169.0 g water in the initial charge and 98.0 g water in the monomer emulsion were used.

Latex 12: Preparation of Latex 9, with these changes: 7.2 g vinyltris(isopropoxy)silane and 1164.2 g n-butyl acrylate were used.

Latex 13: Preparation of Latex 9, using styrene instead of acrylonitrile.

Latex 14: Preparation of Latex 9, with these changes: 65.0 g styrene and 39.0 g acrylonitrile used.

Latex 15: Preparation of Latex 9, with these changes: 39.0 g styrene and 65.0 g acrylonitrile used.

Latex 16: Preparation of Latex 9, with these changes: 26.0 g methacrylic acid and no acrylamide used.

Latex 17: Preparation of Latex 9, with these changes: 7.2 g vinyltris(isopropoxy)silane, 1164.2 g n-butyl acrylate and 0.7 g t-dodecyl mercaptan were used.

Latex 18: Preparation of Latex 9, with these changes: 84.5 g styrene and 19.5 g acrylonitrile used.

Determination of total solids, pH, particle size, and viscosity. Total solids content was determined via the use of a CEM Labware 9000 Microwave Moisture/Solids Analyzer instrument with a 70% power setting. pH determination was conducted by using an Orion 310 pH meter, with calibration being conducted prior to use. Particle size was accomplished via the use of NICOMP™ 308 Submicron Particle Sizer utilizing a dynamic light scattering method at an angle of 90° at 25° C. Viscosity of each latex sample was obtained using a Brookfield RV BF-1 DVII viscometer.

soaking the pieces in deionized water at ambient temperature for 24 h, and measuring the weight of the samples after taking them out of the water. Water absorption is the percentage weight gained, and it consists of an average of 3-5 specimens per test sample.

TABLE 1 maximum strength (N/mm2) and elongation at break (5) for different cure conditions

|  | Cure condition 1 | Cure condition 2 | Cure condition 3 | Cure condition 4 | Cure condition 5 |
| --- | --- | --- | --- | --- | --- |
| Latex 1 | 0.173, 2600% | 0.255, 2600% | 0.289, 2600% | 0.255 2600% | 0.42, 2600% |
| Latex 3 | 0.863, 1330% | 1.43 890% | 1.49 880% | 1.61 700% | 1.42 470% |
| Latex 4 | 0.15, 2600% | 0.25, 2600% | 0.44, 2500% | 0.54, 2100% | 1.48 820% |
| Latex 6 | 0.27, 2460% | 0.72, 2010% | no data | 0.91, 1350% | no data |

Cure condition 1: 5 days at room temperature.
Cure condition 2: 5 days at room temperature and 1 day at 50° C.
Cure condition 3: 5 days at room temperature and 2 days at 50° C.
Cure condition 4: 5 days at room temperature and 3 days at 50° C.
Cure condition 5: 5 days at room temperature and 9 days at 50° C.

Latex 1: 62.8% solids content, pH 7.3, viscosity 290 cps
Latex 2: 63.8% solids content, pH 7.3, viscosity 290 cps
Latex 3: 63.4% solids content, pH 6.6, viscosity 270 cps
Latex 4: 63.2% solids content, pH 6.4, viscosity 360 cps.
Latex 5: 67.7% solids content, pH 6.4, viscosity 1320 cps.
Latex 6: 67.5% solids content, pH 6.4, viscosity 280 cps.
Latex 7: 62.6% solids content, pH 6.5, viscosity 70 cps.
Latex 8: 63.2% solids content, pH 6.4, viscosity 70 cps.
Latex 9: 65.7% solids content, pH 7.6, viscosity 420 cps.
Latex 10: 67.1% solids content, pH 7.6, viscosity 560 cps.
Latex 11: 68.7% solids content, pH 7.4, viscosity 900 cps.
Latex 12: 67.0% solids content, pH 7.8, viscosity 460 cps.
Latex 13: 65.5% solids content, pH 7.0, viscosity 1000 cps.
Latex 14: 66.0% solids content, pH 7.8, viscosity 490 cps.
Latex 15: 66.1% solids content, pH 8.1, viscosity 640 cps
Latex 16: 67.3% solids content, pH 7.0, viscosity 400 cps.
Latex 17: 66.8% solids content, pH 8.3, viscosity 430 cps.
Latex 18: 67.0% solids content, pH 7.6, viscosity 594 cps.

Viscosity at pH 9.5: Latex 1—520 cps, Latex 2—340 cps, Latex 3—270 cps, Latex 4—340 cps, Latex 5→10000 cps, Latex 6→10000 cps, Latex 7—130 cps, Latex 8—141 cps, Latex 9—187 cps, Latex 10—270 cps, Latex 11—986 cps, Latex 12—482 cps, Latex 13→10000 cps, Latex 14—594 cps, Latex 15—574 cps, Latex 16—478 cps, Latex 17—424 cps, Latex 18—1536 cps.

Latex Film Preparation, Mechanical Properties (Tensile Testing) and Water Absorption.

A latex film was first prepared by addition of enough water to achieve a 40% total solids content. The resulting diluted dispersion was then poured into a Teflon mold and allowed to air dry for 3 days at 25° C. with 50% humidity. Optionally thereafter, the film was placed in an oven, at 50° C. for a specified time. Film thickness was in the order of 0.02 inch.

Sample preparation for tensile experiments was carried out by first placing release paper on both sides of the sample and corresponding 0.158" (in width) "dog bone" samples were cut. Typically, three samples were used in testing. An Instron 4505, equipped with a 22 lb load cell was employed. Elongation was carried out at 7.9 in/min, and maximum strength and elongation at break were recorded (see table 1).

Water absorption of the films was determined by cutting out 2 in. by 2 in. film pieces, measuring the dry weight, Water absorption for cure condition 2:

Latex 1—29.2%

Latex 3—25.0%

Latex 4—31.3%

The latex pH was adjusted to the following values with 30% aqueous ammonium hydroxide, and then cure condition 2 was applied. (maximum strength in N/mm2; elongation at break in %)

|  | pH = 6.5 | pH = 7.0 | pH = 8.0 | pH = 9.0 |
| --- | --- | --- | --- | --- |
| Latex 3 | 1.62, 958% | 1.58, 872% | 1.49, 689% | 1.81, 602% |
| Latex 4 | 0.32; 2505% | 0.42, 2568% | 0.53, 2505% | 0.91, 2103% |

For shear test, the samples were formulated in the following way: While stirring, the following ingredients were added to 126 g aqueous dispersion (60-65% solids content): 0.75 g Drewplus L-108 (from Ashland Chemicals), 0.15 g Igepal CO 530 (from Rhodia), 0.15 g Igepal CO 897 (from Rhodia), 1.5 g of a 20% aqueous slurry of STPP (=sodium tripolyphosphate, from Astaris). To this mixture, 135 g Duramite (from Imerys) were added slowly under strong agitation. The pH was adjusted to 8-9 using aqueous KOH, and lastly 3.0 g Latekoll D (BASF Aktiengesellschaft) were added.

Wood-on-wood shear results were obtained using a slightly modified ASTM D 3498 protocol. All dimensions pertaining to the hardwood and plywood are used as those stated in the aforementioned standard. However, after placing two beads of adhesive. on the hardwood with a caulking apparatus, the adhesive was allowed to air dry for 10 minutes prior to placing the plywood strip. Afterward, a ten pound weight was used to press the plywood onto the hardwood. Nails were then used to secure the plywood strip. Testing was then conducted as specified after allowing the samples to dry for 24 h, 5 days, and 2 weeks at 25° C. with 50% humidity. Compression was administered using the Instron 4505 with a crosshead speed of 0.2 in/min, and the maximum load was recorded.

Shear tests. Samples were cured under CT&H conditions. Numbers refer to stress at maximum (N/mm2)

| | 24 h | 5 days | 14 days |
|---|---|---|---|
| Latex 1 | 0.51 | 0.63 | 0.81 |
| Latex 3 | 1.19 | 0.76 | 0.99 |
| Latex 4 | 1.07 | 0.70 | 0.97 |

Latex 10 polymer film tensiles: Cure condition 1 giving 0.66 N/mm2 and 2165%; cure condition 2 giving 1.4 and 1330%; cure condition 3 giving 1.87 and 1412%.

The latex pH was adjusted to the following values with 30% aqueous ammonium hydroxide, and then cure condition 2 was applied. (maximum strength in N/mm2; elongation at break in %, water absorption in %)

| | pH = 8 | pH = 9 | pH = 10 |
|---|---|---|---|
| Latex 10 | 1.25, 1474%, 40% WA | 1.54; 1137%, 36% WA | 1.67, 884%, 39% WA |

| | Cure condition 1 Tensile, elongation | Cure condition 2 Tensile, elongation |
|---|---|---|
| Latex 9 | 0.79, 2235% | 1.15, 2402% |
| Latex 11 | 0.75, 2468% | 0.93, 2452% |
| Latex 12 | 1.03, 2168% | 1.66, 1664% |

| | 90 degrees peel tests.(in N/mm2) | | |
|---|---|---|---|
| | 24 h | 3 days | 15 days |
| Latex 10 | 0.98 | 1.06 | 1.23 |
| Latex 11 | 0.48 | 0.51 | 0.79 |
| Latex 12 | 1.14 | 0.800 | 1.08 |

For these film tests cure condition 2 has been applied.

| | Tensile strength (N/mm2) | Elongation (%) | Water absorption (%) |
|---|---|---|---|
| Latex 13 | 0.77 | 1113 | 17 |
| Latex 14 | 0.88 | 1963 | 30 |
| Latex 15 | 1.01 | 2083 | 29 |

Tensile and elongation data for Latex 16 with cure condition 2: 0,78 and 2390%. Data after addition of 0.15% calcium hydroxide: 1.60 and 1684%; after addition of 0.30% calcium hydroxide: 2.38 and 948% elongation.

Tensile and elongation data for Latex 17 and 18, using cure conditions 2: Latex 17 displays 1.22 and 1538% elongation; Latex 18 displays 1.22 and 2111% elongation.

Abbreviations Used in the Following Tables:
MAA: methacrylic acid
AM. acrylamide
BA: n-butyl acrylate
Silane 1: vinyltriethoxysilane
Silane 2: vinyl(tri-isopropoxy)silane
DAAM: diacetoneacrylamide
AAEM: acetoacetylethylmethacrylate
Sty: styrene
ACN: acrylonitrile

| | Monomers (pphm) | | | Modification | | | | | | Target Solids (%) |
|---|---|---|---|---|---|---|---|---|---|---|
| Latex | MAA | AM | BA | Silane 1 (pphm) | Silane 2 (pphm) | DAAM (pphm) | AAEM (pphm) | Sty (pphm) | ACN (pphm) | |
| 1 | 3.0 | 0 | 92.0 | 0 | 0 | 0 | 0 | 0 | 5.0 | 64% |
| 2 | 3.0 | 0 | 91.0 | 0 | 0 | 0 | 1.0 | 0 | 5.0 | 64% |
| 3 | 3.0 | 0 | 91.0 | 0.6 | 0 | 0 | 0 | 0 | 5.4 | 64% |
| 4 | 3.0 | 0 | 91.0 | 0 | 0.75 | 0 | 0 | 0 | 5.25 | 64% |
| 5 | 3.0 | 0 | 92.0 | 0 | 0 | 0 | 0 | 0 | 5.0 | 70% |
| 6 | 3.0 | 0 | 91.65 | 0.35 | 0 | 0 | 0 | 0 | 5.0 | 70% |
| 7 | 3.0 | 0 | 90.0 | 0 | 0 | 2 | 0 | 0 | 5.0 | 64% |
| 8 | 3.0 | 0 | 91.35 | 0 | 0.4 | 0 | 0 | 0 | 5.25 | 64% |
| 9 | 1.5 | 0.4 | 90.10 | 0 | 0 | 0 | 0 | 0 | 8.0 | 67% |
| 10 | 1.5 | 0.4 | 89.35 | 0 | 0.75 | 0 | 0 | 0 | 8.0 | 67% |
| 11 | 1.5 | 0.4 | 90.10 | 0 | 0 | 0 | 0 | 0 | 8.0 | 70% |
| 12 | 1.5 | 0.4 | 89.55 | 0 | 0.55 | 0 | 0 | 0 | 8.0 | 67% |
| 13 | 1.5 | 0.4 | 90.10 | 0 | 0 | 0 | 0 | 8.0 | 0 | 67% |
| 14 | 1.5 | 0.4 | 90.10 | 0 | 0 | 0 | 0 | 5.0 | 3.0 | 67% |
| 15 | 1.5 | 0.4 | 90.10 | 0 | 0 | 0 | 0 | 3.0 | 5.0 | 67% |
| 16 | 2.0 | 0 | 90.10 | 0 | 0 | 0 | 0 | 0 | 8.0 | 67% |
| 17 | 1.5 | 0.4 | 89.55 | 0 | 0.55 | 0 | 0 | 0 | 8.0 | 67% |
| 18 | 1.5 | 0.4 | 90.10 | 0 | 0 | 0 | 0 | 6.5 | 1.5 | 67% |

Mechanical Properties

| Latex | water ab- sorption | Tensile (24 h, 50 deg C.) Stress N/mm2 | Tensile (24 h, 50 deg C.) Strain (%) | pH | Physical Properties Solids (%) | Physical Properties Viscosity (cps) | Physical Properties Viscosity (pH 9.5) |
|---|---|---|---|---|---|---|---|
| 1 | 29% | 0.3 | 2602 | 7.3 | 62.8 | 290 | 520 |
| 2 | 26% | 0.17 | 2605 | 7.3 | 63.76 | 290 | 340 |
| 3 | 25% | 1.63 | 958 | 6.6 | 63.4 | 270 | 270# |
| 4 | 31% | 0.33 | 2505 | 6.4 | 63.2 | 360 | 340# |
| 5 | 35% | 0.14 | 2538 | 6.4 | 67.7 | 1320 | 10000 |
| 6 |  | 0.73 | 2015 | 6.4 | 67.54 | 276 | 10000 |
| 7 |  | 0.31 | 2606 | 6.5 | 62.6 | 70 | 130 |
| 8 |  |  |  | 6.4 | 63.15 | 73 | 141 |
| 9 | 35% | 0.87 | 1982 | 7.6 | 65.7 | 420 | 187 |
| 10 | 44% | 1.41 | 1330 | 7.6 | 67.1 | 560 | 270 |
| 11 | 45% | 0.94 | 2452 | 7.4 | 68.65 | 902 | 986 |
| 12 | 40% | 1.67 | 1664 | 7.8 | 66.96 | 460 | 482 |
| 13 | 17% | 0.78 | 1113 | 7.0 | 65.46 | 1000 | 10000 |
| 14 | 30% | 0.88 | 1963 | 7.8 | 66.02 | 494 | 594 |
| 15 | 29% | 1.02 | 2083 | 8.1 | 66.12 | 638 | 574 |
| 16 | 29% | 0.78 | 2390 | 7.0 | 67.3 | 404 | 478 |
| 17 | 31% | 1.23 | 1538 | 8.3 | 66.8 | 434 | 424 |
| 18 | 19% | 1.23 | 2111 | 7.6 | 67.0 | 594 | 1536 |

B) Examples for Flexible Floor Coverings

1. Preparation of Polymer-Dispersions By Emulsion Polymerization

For the emulsion polymerization a polystyrene seed (1.5% by weight based on monomers) and a third of the amount of itaconic acid were included in the initial charge.

The polymerization temperature was 78° C. The initiator used was sodium persulfate and the emulsifier used was Texapon® NSO-IS (aliphatic, ethoxylated Na salt).

The monomers are metered in over a period of 5.5 hours, the initiator solution over a period of 6 hours.

The composition of the polymers is indicated in the following table (in parts by weight)

|  | Example | Comparison |
|---|---|---|
| BA | 87.5 | 87.5 |
| MMA | 10 | 10 |
| AA | 2.5 | 2.5 |
| tDMC | 0.08 | 0.08 |
| MEMO | 0.025 | — |
| Solids % | 63.0 | 63.6 |
| pH value | 6.6 | 6.2 |
| Viscosity mPas | 114 | 86 |

BA: n-butyl acrylate
MMA: methyl methacrylate
AA: acrylic acid
tDMC: Molecular weight regulator, tertiary-dodecyl mercaptan (amounts in parts by weight per 100 parts by weight of monomers)
MEMO: methacryloxy propyltrimethoxysilane 2. Preparation of the Aqueous Compositions The polymer dispersions were mixed with the fillers, tackifiers and further additives indicated in the following table.

| Polymer dispersion of the Example | 28.6 | — |
|---|---|---|
| Polymer dispersion of the Comparison example | — | 28.6 |
| Tackifier | 10 | 10 |
| Latekoll D 4% solution | 13.6 | 14.1 |
| Agitan VP 282 | 0.2 | 0.2 |
| Pigmentverteiler NL | 1 | 1 |
| Ulmer Weiss XM | 46.4 | 46.4 |

Amounts in parts by weight

| tackifier | 50 parts Dercol M 10 (tackifier on basis of abietic acid); 45 parts Bremasin (tackifier on basis of abietic acid ester), 5 parts Lumiten (emulsifier) |
|---|---|
| Latekoll: | Thickener (BASF) |
| Agitan: | Defoamer (Münzing) |
| Pigmentverteiler NL: | Dispersing assistant (BASF) |
| Ulmer Weiss XM: | Calcium carbonate, filler (Ulmo-Füllstoff-Vertrieb) |

3. Performance Testing

Green Strength Development

The adhesive is discharged using a DIN coater to a cement fiberboard panel (e.g., Eternit® 2000) (20×50 cm) in the direction of takeoff. The amount applied is about 350-400 g/m$^2$. Needlefelt floor covering strips (NFC strips) are placed in the bed of adhesive after 10 minutes and are pressed on with a 2.5 kg roller by rolling backward and forward 3 times. 30 minutes thereafter the strips are pulled off with a takeoff device, whereby the peel resistance is measured in N 5 cm.

Heat Resistance

After airing for 5 minutes five PVC test stripes (60×50 mm), which are coated with the adhesive, are adhered to fibre-cement as laid down in DIN 16860 (10 cm2 bonding area) and kept for 14 days in standard laboratory atmosphere. Afterwards they are conditioned for 30 minutes at 50° C., a load of 2 kg is then applied and the specimens are kept at 50° C. in a circulated-air-oven until they become detached 8 max. 1440 min.).

The results are set out in the following table:

| Dispersion | Example | Comparison example |
|---|---|---|
| Green strength development (N/5 cm) | 21 | 9 |
| Heat resistance at 50° C. (min) | greater 1440 | 85 |

The invention claimed is:

1. A process for bonding a non-ceramic floor covering to a substrate, comprising:
    applying an aqueous adhesive comprising a synthetic polymer as a binder and hydrolyzable silane groups and further a filler in an amount of 10 to 1000 parts by weight per 100 parts by weight of polymer (solids) between a surface of the non-ceramic floor covering and a substrate to effect bonding therebetween.

2. The process according to claim 1, wherein the synthetic polymer comprises hydrolyzable silane groups or the adhesive comprises a further additive with hydrolyzable silane groups.

3. The process according to claim 1, wherein the silane groups are bonded to the polymer and are groups of the formula

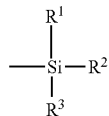

where $R^1$ to $R^3$ independently of one another are each an organic radical, with the proviso that at least one of the radicals is an alkoxy group.

4. The process according to claim 1, wherein the amount of silane groups ranges from 0.001 to 0.1 mol/100 g of the polymer.

5. The process according to claim 1, wherein the polymer is synthesized from at least 40% by weight of principal monomers selected from the group consisting of $C_1$ to $C_{20}$-alkyl (meth)acrylates, vinyl esters of carboxylic acids comprising up to 20 carbon atoms, vinyl aromatics having up to 20 carbon atoms, ethylenically unsaturated nitriles, vinyl halides, vinyl ethers of alcohols comprising 1 to 10 carbon atoms, aliphatic hydrocarbons having 2 to 8 carbon atoms and one or two double bonds, and mixtures of these monomers.

6. The process according to claim 1, wherein the polymer is composed of at least 40% by weight of $C_1$ to $C_{20}$-alkyl(meth) acrylates.

7. The process according to claim 1, wherein the silane groups are attached to the polymer as a result of copolymerization with monomers comprising silane groups, by conducting a polymerization reaction in a medium containing a regulator comprising silane groups, or by reaction of the polymer with reactive compounds comprising silane groups.

8. The process according to claim 7, wherein the weight fraction of the regulators and monomers comprising silane groups is 0.005 to 5 parts by weight per 100 parts by weight of polymer.

9. The process according to claim 1, wherein the polymer is an emulsion polymer and is in the form of an aqueous polymer dispersion.

10. The process according to claim 1, wherein the solids content of the aqueous polymer dispersion ranges from 50% to 75% by weight.

11. The process according to claim 10, wherein the solids content of the aqueous polymer dispersion ranges from 55% to 70% by weight.

12. The process according to claim 1, wherein the synthetic polymer exists as a polymer dispersion having a viscosity ranging from 50 to 1000 mPas.

13. The process according to claim 12, wherein the viscosity of the polymer dispersion is 50 to 500 mPas.

14. The process according to claim 1, wherein the synthetic polymer has a glass transition temperature ranging from −60° to 0° C.

15. The process according to claim 1, wherein the floor covering is a flexible floor covering.

16. The process according to claim 15, wherein the flexible floor covering is a carpet.

17. The process according to claim 15, wherein the adhesive comprises 10 to 400 parts by weight of a filler per 100 parts by weight of polymer (solids).

18. The process according to claim 15, wherein the adhesive optionally further comprises tackifying resins, thickeners and wetting agents.

19. The process according to claim 1, wherein the floor covering is a non-flexible floor covering of wood.

20. The process according to claim 19, wherein the wood floor covering is woodblock or a wood laminate.

* * * * *